May 22, 1956  C. L. COOK  2,746,371
PLOW DISK
Filed Jan. 8, 1953  2 Sheets-Sheet 1
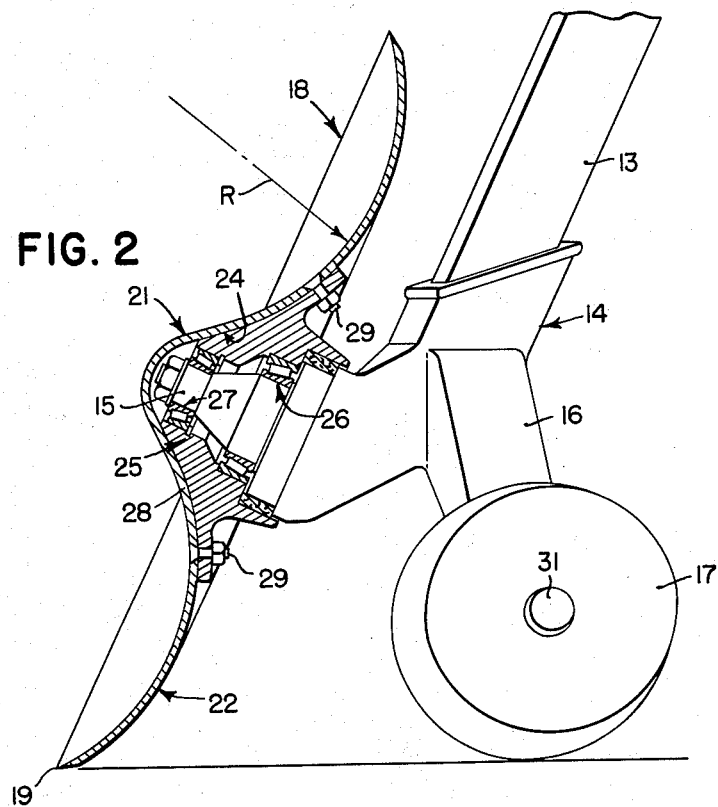
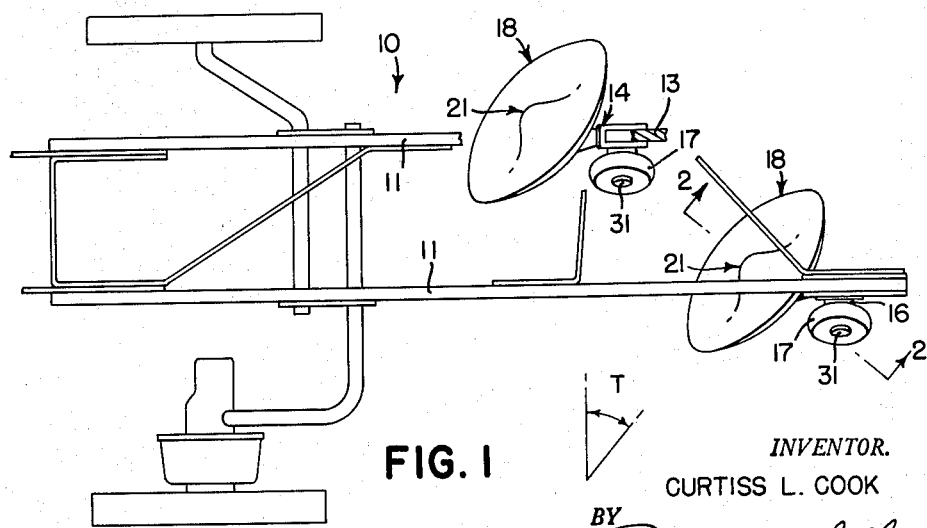
INVENTOR.
CURTISS L. COOK
BY
ATTORNEYS May 22, 1956 C. L. COOK 2,746,371
PLOW DISK
Filed Jan. 8, 1953 2 Sheets-Sheet 2
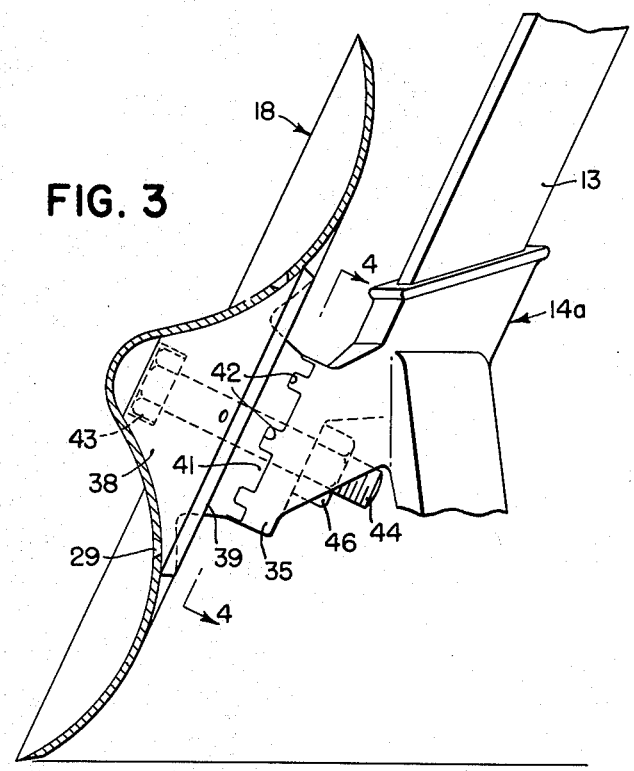
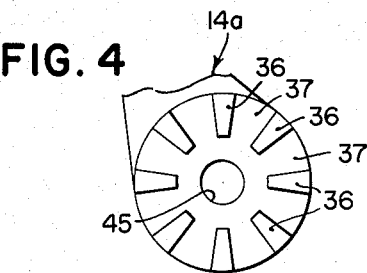
INVENTOR.
CURTISS L. COOK
ATTORNEYS

United States Patent Office 2,746,371
Patented May 22, 1956

2,746,371
PLOW DISK

Curtiss L. Cook, Syracuse, N. Y., assignor to Deere & Company, Moline, Ill., a corporation of Illinois Application January 8, 1953, Serial No. 330,239

1 Claim. (Cl. 97—217)

The present invention relates generally to agricultural implements and more particularly to plows and similar ground-working tools.

The object and general nature of the present invention is the provision of a plow disk particularly constructed and arranged to accomplish about the same turning effect of a moldboard type plow bottom while still possessing the advantages of a disk plow, with particular reference to the ability of the latter to absorb shock loads and the like.

Specifically, one feature of the present invention resides in the provision of a plow disk having a reverse curvature, that is, while the plow disk is of general concavo-convex configuration, the central portion of the blow disk is protruded or extended axially beyond the concave side of the disk, extending axially beyond the plane of the edge of the disk about the same distance as the distance the opposite side of the disk lies from said plane. This provides a plow disk having a peripheral section that is somewhat toroidal with a relatively small radius of curvature, the radius being appreciably less than half the diameter of the disk as a whole. By virtue of this arrangement, all of the advantages of a disk of relatively large diameter are retained while at the same time securing the turning effect of a relatively small disk.

Also, it is a feature of this invention to provide a ground-working disk of generally concavo-convex configuration, with a central portion extended beyond the concave side of the disk so as to provide space at the back of the disk for receiving a bearing structure that is disposed more or less centrally in the plane that contains the edge of the disk member. In this way, the bearing supporting the disk for rotation is located in approximately the best possible location to withstand the thrusts and forces involved in a plowing or like operation.

A further feature of this invention is the provision of supporting means for a disk-type furrow opener, so constructed and arranged that the ground-engaging peripheral portions of the disk are so disposed, with respect to the direction of forward travel, as to provide a leading edge making approximately the same angle as that of the wing of a conventional moldboard plow bottom.

Still further, another feature of this invention is the provision of the support for a disk furrow opener in which ample space is provided for a landside wheel that functions similar to the landside of a moldboard plow bottom for taking the side thrusts arising during the plowing operation and, additionally, it is a feature of this invention to provide a landside wheel with a curved rim portion so as to cooperate with the furrow wall left by the disk-type furrow opener.

It is also a further feature of this invention to provide a disk-type furrow opener held against rotation to an associated standard by means which provides for rotating the disk furrow opener to different positions of adjustment and thereby provide for selectively locking the disk furrow opener in the desired operating position, whereby different peripheral portions of the disk may be presented to the soil, thereby distributing the wear throughout the entire periphery of the disk.

These and other objects and advantages of the present invention will be apparent to those skilled in the art after a consideration of the following detailed description of one embodiment of the invention, taken in conjunction with the accompanying drawings illustrating such embodiment.

In the drawings:

Figure 1 is a plan view of a plow, employing disks, as furrow openers, in which the principles of the present invention have been incorporated.

Figure 2 is an enlarged sectional view of the disk, corresponding to a section taken generally along the line 2—2 of Figure 1.

Figure 3 is a view similar to Figure 1, showing a modified form of the present invention in which the disk furrow opener is held against rotation by means providing for disposing the disk in any one of a number of different positions relative to the supporting standard.

Figure 4 is a fragmentary view of the lower portion of the disk-supporting standard, corresponding to a view taken generally along the line 4—4 of Figure 3.

Referring now to the drawings, particularly Figure 1, the plow in which the present invention has been incorporated is indicated in its entirety by the reference numeral 10 and includes a pair of beams 11, each having at its rear end a downwardly extending standard 13 fixed to the beam in any suitable way. Secured to the lower end of each standard 13 is a beam foot carrying a forwardly, upwardly, and outwardly extending spindle section 15. The beam foot 14 also carries an extension 16 on which a landside wheel 17 is journaled for rotation in a plane that is inclined from the vertical.

The plow disk of the present invention is indicated in its entirety by the reference numeral 18 and, as best shown in Figure 2, comprises a disk member of generally concavo-convex form, with a cutting edge 19 that lies in a plane extending at right angles to the axis of rotation of the disk. Centrally, the disk member 18 is formed with a generally axially extending protuberance 21, and radially outwardly of the latter the disk is formed with a generally toroidal-like section 22. The radius of curvature of the latter section, indicated at R, is between about one-third to one-half the diameter of the disk member 18. The thickness of the material of which the disk 18 is formed is substantially constant, and the protruding central section 21 extends axially from the concave side of the disk a distance from the plane containing the cutting edge 19 that is substantially equal to the distance between said plane and the back side of the disk. The protruding central section 21 therefore provides, at the back side of the disk, a space or socket 24 that is admirably adapted to receive a bearing structure, such as the one indicated at 25, that is disposed substantially in the aforesaid plane. As best shown in Figure 2, the bearing structure 25 includes inner and outer roller bearing units 26 and 27 disposed at opposite sides of the plane containing the cutting edge 19 and received in a generally conical bearing support 28 to which the disk 18 is fixed as by bolts or rivets 29.

As will be understood by reference to Figure 2, the relatively small radius curvature of the disk section 22 provides an excellent turning effect, approximating that of the moldboard plow having the usual type of share and moldboard. Preferably, the disk member is set so that the plane of its cutting edge makes an angle of approximately 25° with respect to a vertical line. With this angle, particularly with the curvature R of the operating section 22 of the disk, good penetration will be secured. Further, each disk member 18 and its associated mounting are preferably arranged in the plow as a whole so that the vertical plane passing through a diameter of the disk 18 makes an angle of approximately 40 or 50° with respect to the direction of forward travel, indicated at T in Figure 1.

The lower portion of the beam foot extension 16 is provided with spindle means 31 on which the landside wheel 17, mentioned above, is journaled for rotation. As will be seen best from Figure 2, the peripheral portion of the landside wheel 17 is curved so as to correspond generally to the curvature of the furrow wall left by the disk furrow opener 18. The spindle 31 is so fixed to the supporting extension 16 that the landside wheel lies at the proper angle to best withstand the landwardly directed reactions to which the wheel 17 is subjected in operation.

If desired, the disk member may be so mounted on the standard 13 that it is fixed against rotation. Also, suitable means may be provided for optionally holding the disk in different positions, thereby presenting different portions of the disk member to the soil, whereby the wear on the member 18 will be uniform.

Referring now to Figures 3 and 4, the beam foot 14a that is fixed to the lower end of the beam standard 13 is formed with a lower rosette section 35 having alternate ribs 36 and spaces 37. In this form of the invention, the rotatable bearing construction shown in Figure 2 is eliminated and, in lieu of the bearing support 28, a generally conical part 38 is fixed, as by the bolts or rivets 29, to the disk 18. The part 38 is provided with a hub section 39 having lugs and spaces 41 and 42 formed complementarily with respect to the lugs and spaces 36 and 37 on the part 35. A relatively heavy attaching bolt 43 is carried by the conical member 38 and has a threaded section 44 passed through an opening 45 in the beam foot section 35. The threaded portion 44 carries a clamping nut 46 which, when tightened, securely holds the disk 18 in position on the lower end of the beam standard 13. By loosening the nut 46 an amount sufficient to disengage the cooperating lugs on the parts 35 and 38, the disk may be rotated in steps of approximately 45° so as to present new surfaces of the disk 18 to the soil.

While I have shown and described above the preferred structure in which the principles of the present invention have been incorporated, it is to be understood that my invention is not to be limited to the particular details shown and described above but that, in fact, widely different means may be employed in the practice of the broader aspects of my invention.

What I claim, therefore, and desire to secure by Letters Patent is:

In a ground-working implement, a generally concavo-convex disk having the central portion thereof formed with a hollow protuberance extending outwardly from the concave side a distance beyond the plane of the peripheral portion of the disk, a bearing support shaped to substantially fit within the hollow of said protuberance at the back side of the disk and lying substantially entirely inwardly of the plane that passes tangentially at the back side of the concave portion of the disk radially outwardly of said central portion of the disk, said bearing support having a through opening to form bearing-receiving means and a radially outwardly disposed portion detachably connected with the disk adjacent the invert section of said concave disk portion, and a bearing for said disk including a pair of axially spaced apart bearing portions disposed within the bearing receiving opening of said bearing support, both of said bearing portions lying inwardly of said last mentioned plane.

References Cited in the file of this patent

UNITED STATES PATENTS

| | | |
|---|---|---|
| 530,964 | Roberts | Dec. 18, 1894 |
| 621,701 | Packham | Mar. 21, 1899 |
| 882,353 | Speirs | Mar. 17, 1908 |
| 903,120 | Weeks | Nov. 3, 1908 |
| 1,477,022 | Wood | Dec. 11, 1923 |
| 1,917,674 | Weaver | July 11, 1933 |
| 2,560,965 | Lewis | July 17, 1951 |